United States Patent [19]
Gronstedt

[11] 3,843,167
[45] Oct. 22, 1974

[54] HYDRAULICALLY ACTUATED PIPE COUPLING

[76] Inventor: Bo Gronstedt, 1540 Hubbard Rd., Pasadena, Tex. 44057

[22] Filed: Jan. 31, 1973

[21] Appl. No.: 328,395

[52] U.S. Cl.............. 285/18, 285/105, 285/146
[51] Int. Cl............................................ F16l 55/00
[58] Field of Search ....... 285/18, 96, 104, 105, 146, 285/148, DIG. 21

[56] References Cited
UNITED STATES PATENTS

| | | | |
|---|---|---|---|
| 2,493,556 | 1/1950 | Stone | 285/146 |
| 2,691,418 | 10/1954 | Connolly | 285/105 X |
| 3,097,866 | 7/1963 | Iverser | 285/18 |
| 3,222,076 | 12/1965 | Hollingsworth | 285/97 X |
| 3,393,926 | 7/1968 | Arnold | 285/18 |
| 3,486,772 | 12/1969 | Elsner | 285/96 |
| 3,600,010 | 8/1971 | Downs | 285/96 |

Primary Examiner—Alfred R. Guest
Attorney, Agent, or Firm—Fulbright & Crooker

[57] ABSTRACT

A pipe coupling particularly designed for use in undersea environments, which is hydraulically actuated. The coupling includes an inflatable bladder which seals against the pipe inserted in the coupling, and which also extends to set metal slips against the pipe to hold it in the coupling. Improvements in both the slips and bladder arrangement are disclosed.

9 Claims, 5 Drawing Figures

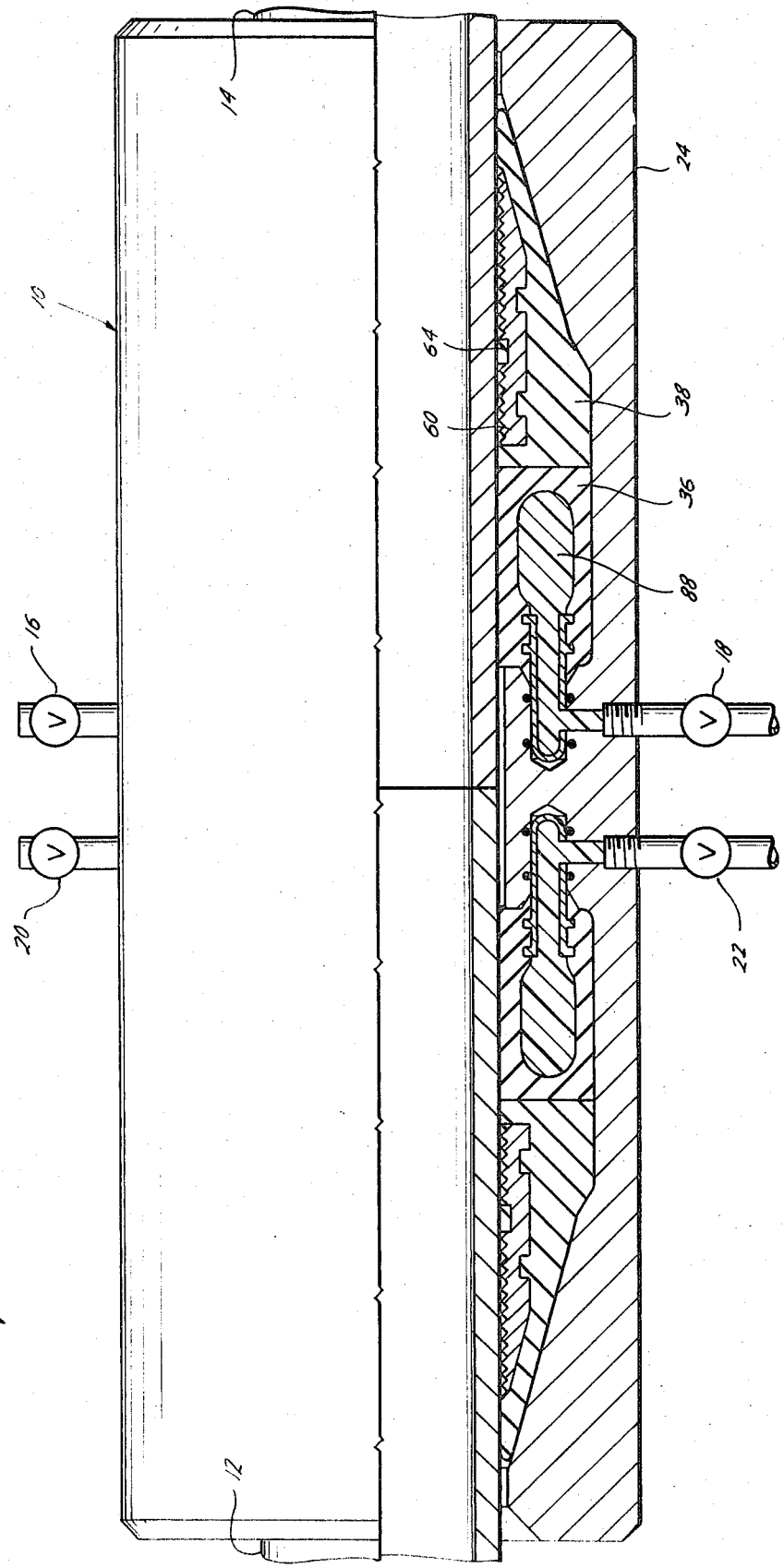

3,843,167

HYDRAULICALLY ACTUATED PIPE COUPLING

BACKGROUND OF THE INVENTION

The present invention generally relates to a pipe coupling, and more specifically to a hydraulically actuated pipe coupling for use in an underwater environment, and to the improvements in the bladder and slips provided in the coupling.

Hydraulically actuated pipe couplings, particularly for use in a dry-land environment, are well known in the art. Examples of U.S. Pat. showing such couplings are those to Graham, No. 2,508,914, Hollingsworth, No. 3,222,076, Arnold, No. 3,393,926, Elsner, No. 3,486,772, and Downs, No. 3,600,010. With the exception of the patent to Arnold, these prior art devices are not generally suitable for use and operation by divers in an undersea environment. Because of the restricted maneuverability of a diver, very large clearances between the inside of the coupling and the outside of the pipe must be provided so that the coupling can be implaced in a reasonable amount of time. Further, the seal must be effective and fool-proof. These problems are overcome by the present invention.

SUMMARY

The present invention provides a hydraulically actuated pipe coupling which is particularly adapted for an undersea environment, and for manipulation by a diver. Under these circumstances, the making up of a coupling must be quickly done without requiring manual manipulation, such as operating nuts and bolts, or welding operations. Further, large tolerances must be provided because of the difficulty of maneuvering large sections of pipe and couplings about in the environment contemplated. This is achieved in the present invention by utilizing an inflatable bladder and rubber-mounted slips which seal and grip the pipe within the coupling. Because of the particular construction of the present coupling, the inside diameter of the coupling may be up to one-half inch larger than the outside diameter of the pipe. The bladder is fitted with inflation tubes which allow the bleeding out of air from the inside, so that the bladder may be wholly filled with hydraulic fluid or an appropriate compound such as epoxy, which will set up to render the coupling permanent. The metal slips which grip and retain the pipe are surrounded by rubber which will seal against the pipe and includes grooves in the slips for further intermediate sealing of the slips. The coupling may be designed for the independent joinder of two pieces of pipe, or the coupling may be arranged with a welding or bolting flange for connection to a manifold, or other object.

Thus, it is an object of the present invention to provide a hydraulically actuated pipe coupling for particular use in an undersea environment where manipulation by a diver is contemplated.

It is a further object of the present invention to provide a pipe coupling which may be utilized to effectively seal and grip a piece of pipe inserted therein simply upon the application of hydraulic pressure.

Other and further objects, features and advantages will be apparent from the following description of the presently-preferred embodiments of the invention, given for the purpose of disclosure, taken in conjunction with the following drawings:

BRIEF DESCRIPTION OF THE DRAWINGS

Like character references designate like parts throughout the several views of the drawings, which are:

FIG. 2 is a partial sectional side view, similar to FIG. 1, showing the bladder inflated and the coupling to the inserted pipe secure.

DESCRIPTION OF THE PREFERRED EMBODIMENTS

Figure 1:
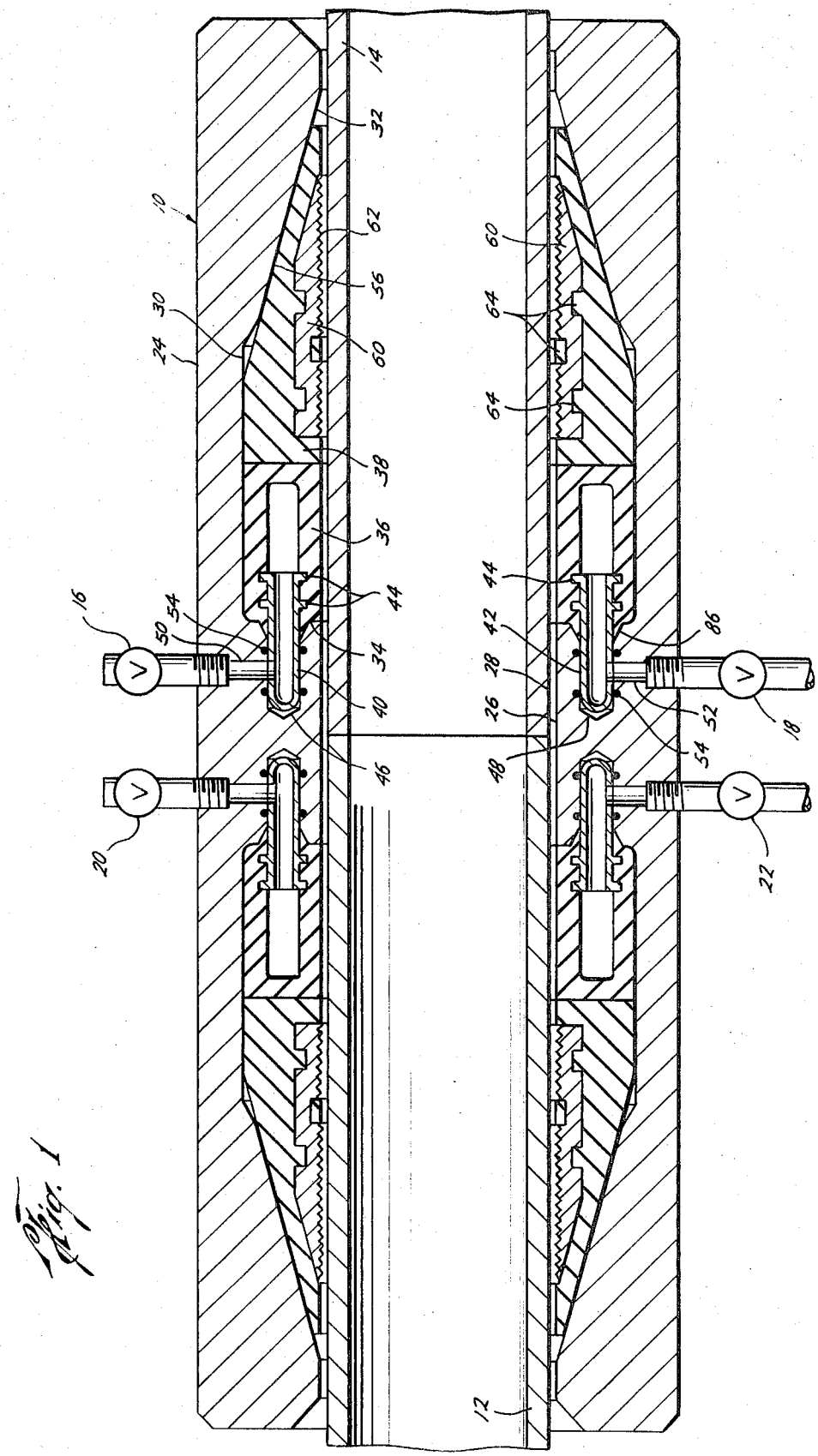
FIG. 1 is a partial sectional side view of the coupling.

Referring now to FIG. 2, the reference numeral 10 generally designates the coupling of the present invention, which is here shown with pipes 12 and 14 inserted therein. Appropriately fastened to the coupling 10 are valves 16, 18, 20 and 22, which are utilized for controlling the input of hydraulic fluid for actuation of a coupling, and for the bleeding of air from, as will be more fully described hereinafter.

Referring now to FIG. 1, it is seen that the coupling 10 generally includes an elongate cylindrical tubular body 24, whose inside diameter 26 is somewhat larger than the outside diameter 28 of the pipe 14 inserted therein. This clearance may be on the order of a quarter inch when dealing with pipe of 9-inch outside diameter.

Within the body 24 is a recess 30. The recess 30 is conical or tapered at the end 32 of the recess adjacent the outer end of the body 24. The opposite end 34 of the recess 30 is generally transverse to the axis of the body 24.

Fitting within the recess 30 is an annular bladder 36 and an annular wedge 38. The bladder 36 is made of an elastic, deformable material, such as rubber or other similar material. A pair of inflation tubes 40 and 42 are vulcanized or otherwise suitably attached to the bladder 36. The inflation tubes may include upstanding shoulders 44 to better retain them in the bladder 36. The inflation tubes 40 and 42 fit respectively into ports 46 and 48, drilled into the body 24. Communicating with the ports 46 and 48 are passageways 50 and 52, which respectively connect with the valves 16 and 18, mentioned above. On either side of the connection of the passageways 50 and 52 with the ports 46 and 48 may be fitted appropriate sealing means 54, here shown as O-rings. The sealing means 54 are utilized to prevent hydraulic fluid from leaking about the inflation tubes into the recess 30.

Between the bladder 36 and the tapered wall 32 of the recess 30 is the wedge 38, which may consist of one or more segments, arranged in the form of an annulus. The outer wall 56 of the wedge is also tapered to mate with tapered wall 32. In the preferred embodiment, the wedge consists essentially of an elastic deformable material, such as rubber having steel slips 60 embedded therein. The slips 60 also include serrated teeth 62 which are designed to contact and hold the pipe 14 inserted therein. A number of grooves 64 are cut across both the inside and outside of each slip 60 and the material of the wedge fills these recesses.

Figure 4:
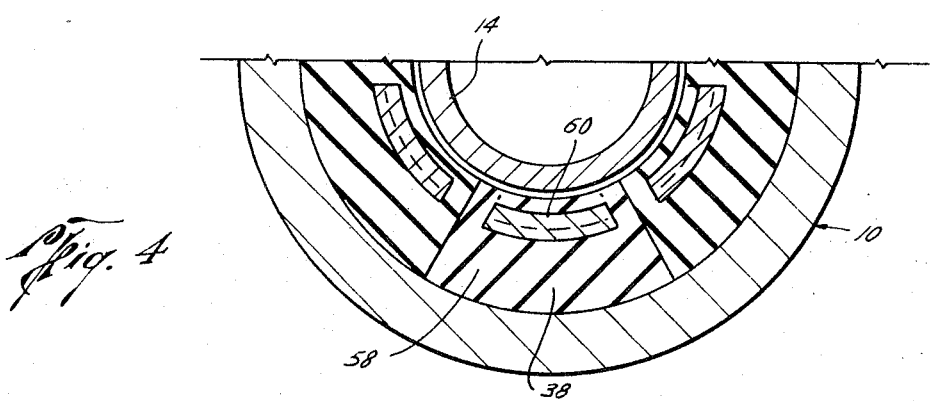
FIG. 4 is a partial sectional end view taken along the line 4—4 of FIG. 3.

Thus, referring to FIG. 4, it is seen that there are a plurality of slips 60 about the pipe 14, and that the deformable material of each wedge 38 continues through the recesses 64. Instead of utilizing a plurality of wedges 38, a single annular wedge may be provided with a number of segmented slips 60 embedded therein. If this were so, it would be necessary to slit the annular wedge axially, so that it could be collapsed for insertion into the recess 30.

Figure 3A:
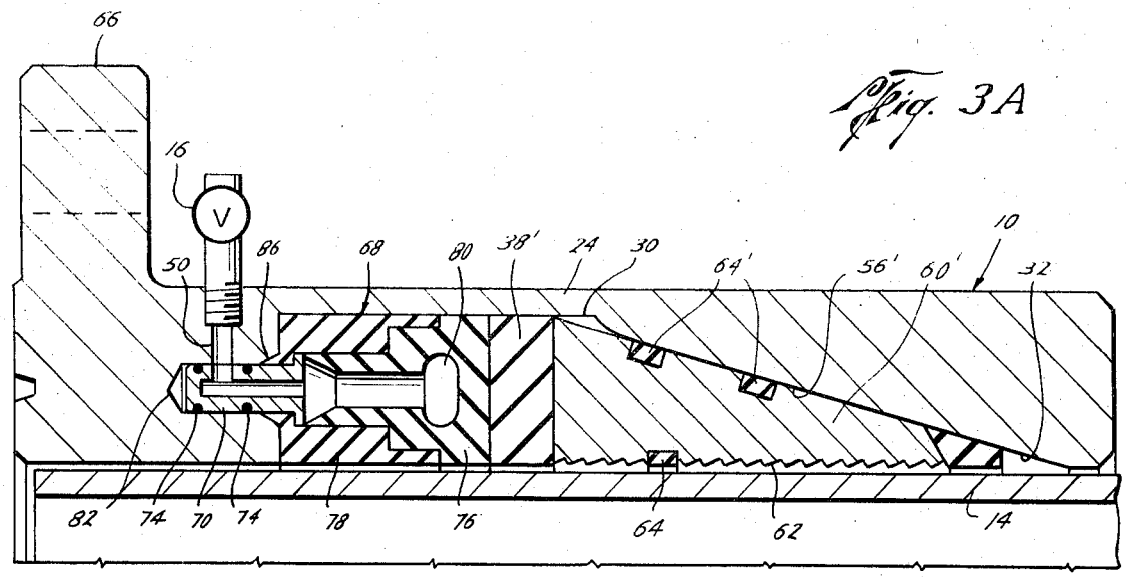
FIG. 3A is a view similar to FIG. 3, showing a modified form of slip.

As an alternative, the slips may be so constructed that both the portion which grips the pipe and the tapered portion which engages the tapered wall are a single piece of steel. This construction is shown in FIG. 3A, wherein like parts to those previously described have had prime marks added. Thus, it is seen that the wedge 38' has one or more slips 60' embedded therein, and slip 60' has serrated teeth 62 to grip the pipe, and a tapered wall 56' to mate with the tapered wall 32 of the coupling. Grooves 64 and 64' are cut in the slip 60', and the deformable material of the wedge 38' fills these grooves.

As seen in FIG. 1, a symmetrically arranged bladder and wedges are provided for separate actuation and holding of pipe 12. Alternatively, and referring to FIGS. 3 or 3A, it is also seen that a standard type bolting flange 66 may be provided instead of the symmetrical arrangement disclosed in FIG. 1. By the same token, a standard welding flange could also be provided.

Figure 3:
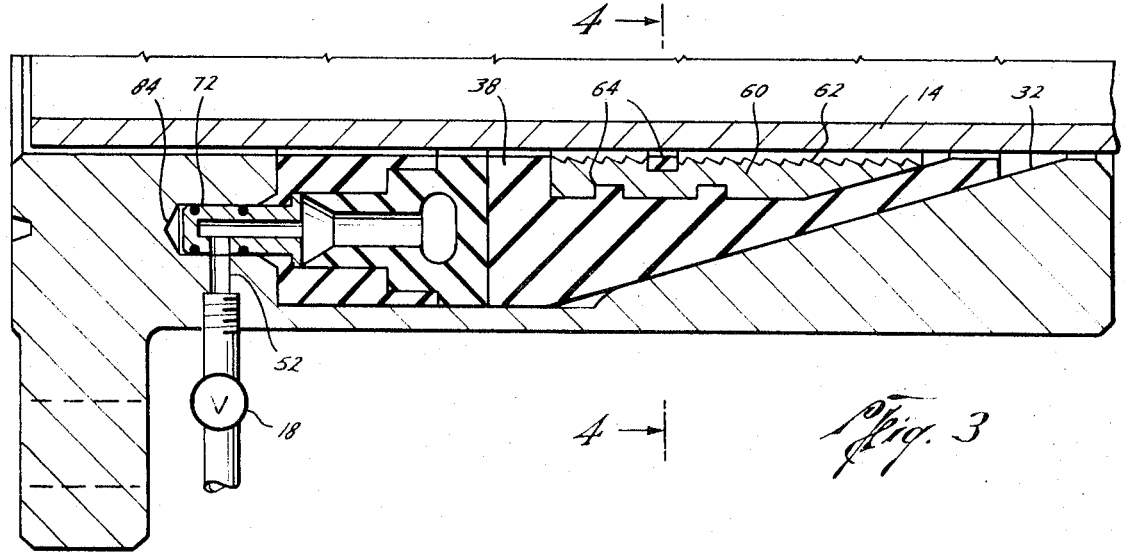
FIG. 3 is a partial sectional side view of another embodiment of the invention, with a modified bladder arrangement.

With further reference to FIGS. 3 and 3A, it is seen that essentially the same items in this embodiment are provided as were discussed with regard to FIG. 1, and similar members have been given similar parts. FIGS. 3 and 3A do disclose a different arrangement of the bladder 68, as well as a different form of inflation tubes 70 and 72, along with sealing elements 74. In this instance, the bladder 68 is made of two elements, namely, the cavity member 76 and the head member 78. The cavity member 76 includes a cavity 80 which communicates with the inflation tubes 70 and 72 through an appropriate passageway. The head member 78 slides telescopically over a portion of the cavity member 76. The inflation tubes 70 and 72 may be vulcanized or otherwise attached to the head member 78, although this is not essential in this embodiment. Notice that the sealing members 74 are here shown as O-rings set within the inflation tubes rather than set within the body 24 of the ports 82 and 84, as was the case in FIG. 1. Notice also that in both FIGS. 1, 3 and 3A the bladders include a conical tip 86 surrounding the inflation tubes. The purpose of this conical tip is to further seal the bladder during initial inflation, as will be hereinafter described.

In use, the pipe 14 to be coupled to the coupling 10 is inserted into the appropriate half of the body 24. In the case of the embodiment shown in FIG. 1, a further piece of pipe 12 is inserted in the opposite half, if not previously attached. In the case of the embodiments shown in FIGS. 3 and 3A, the flange 66 is already attached to a further device. Prior to application of the valves 16–22, a drill is utilized to drill a hole through the inflation tubes so that the passageways connect to the interior of the bladder. To actuate the coupling, the valve 18 is opened to allow hydrulic fluid to flow into passageway 52 and through inflation tube 42 into the cavity in the bladder 36. Valve 16 is opened so that any air within the bladder and within the tubes and passageways is expelled therethrough. After hydrulic fluid is seen to be flowing freely from valve 16 it is closed. Thereupon, the addition of further pressurized fluid through valve 18 serves to inflate bladder 36 so that it swells and expands to seal about pipe 14. This action is illustrated in FIG. 2. Additional fluid expands bladder 36 axially against wedge 38. Wedge 38 is forced inwardly (contracts) against the pipe 14 because of the tapered wall 32 as it moves along the axis of the coupling 10. Soon, the slips 60 contact the other diameter of the pipe 14 and further fluid inserted into the bladder 36 causes the wedge 38 to expand and fill the remaining space about the pipe 14 on both ends of the slips 60 within the body 24 of the coupling 10. Additionally, because of the compression of the deformable material in the wedge 38, that part of the wedge which is within the groove 64 also bulges and expands to contact the pipe 14. It is contemplated that the hydraulic fluid pressure will be in the vicinity of 2,000 psi. Thereupon, valve 18 is closed, and the pipe 14 is thus secured and sealed to the coupling 10. Endwise pressure on the pipe 14 will only serve to set the slip 60 even deeper into the pipe 14. The sealing members 54 serve to prevent the flow of hydraulic fluid about the outside of the inflation tubes 40 and 42.

In the embodiments shown in FIGS. 3 and 3A, hydraulic fluid introduced through the valve 18 not only serves to expand the bladder 68 so that it contacts the pipe 14, but also allows head member 78 to telescope with relation to the cavity member 76. Of course, the inflation of the cavity 80 serves to seal the telescoping joint between the members 76 and 78, thereby preventing any leakage at the interface. The action of the wedge 38 or 38' is the same as that previously described with reference to FIG. 1.

Although the term "hydraulic fluid" has been utilized, it should also be understood that various mediums may be utilized for inflation of the bladder. For example, a flowable epoxy compound, which has been catalyzed, may be utilized for the inflation and setting of the coupling about the pipe, and of course this compound will set up to firmly and permanently couple the coupling 10 to the pipe 14.

Thus it is seen that the present invention provides a hydraulically actuated pipe coupling which is particularly suited for use in an underwater environment, particularly by divers, where a minimum of manual operation of the diver is required. Further, the coupling of the present invention is capable of being manufactured with a sufficiently large difference between the inside diameter of the coupling body and the outside diameter of the pipes that it may be more efficiently placed on the pipe.

The present invention, therefore, is well adapted to carry out the objects and attain the ends and advantages mentioned, as well as others inherent therein. While the presently preferred embodiments of the invention have been given for the purpose of disclosure, numerous changes in the details of construction and the combination, shape, size and arrangement of parts may be resorted to without departing from the spirit and scope of the invention.

What is claimed is:

1. A hydraulically actuated pipe coupling including:

an elongate, generally cylindrical, tubular body,
the body adapted to receive in at least one end a piece of pipe to be coupled thereto,
the inside diameter of the body being larger than the outside diameter of the pipe,
an elongate recess within the body,
the recess being tapered to the inside diameter of the body adjacent the end adapted to receive the pipe, first and second ports within the body communicating with the recess,
first and second valves hydraulically communicating with the first and second ports respectively,
an annular hollow inflatable bladder mounted within the recess,
inflation tubes extending from the bladder into the first and second ports whereby hydraulic communication is established between the valves and the interior of the inflatable bladder,
an annular wedge member within the recess slidingly engaging the tapered portion of the recess,
the inside diameter of the bladder and the wedge being substantially the same as the inside diameter of the body,
a plurality of independent serrated slips imbedded intermediate the ends of the wedge,
the serrated surface of the slips arranged about the pipe when inserted into the body, and
the wedge and bladder being formed of an elastic deformable material, whereby fluid injected into the bladder serves to inflate the bladder to seal about the pipe and to force the wedge into contact with the pipe so that the slips grip the pipe.

2. The invention of claim 1 including:
sealing means arranged to prevent leakage of fluid between the ports and inflation tubes.

3. The invention of claim 2 wherein:
the slips include a groove across the inside diameter thereof, said groove including and communicating with the wedge.

4. The invention of claim 3 wherein:
the bladder includes a cavity member and a head member telescopically arranged about a portion of the cavity member.

5. The invention of claim 3 wherein:
the wedge is segmented radially along the axis thereof.

6. The improvement in a pipe coupling having a radially contracting wedge axially actuated by an inflatable bladder, the improvement including:
first and second valve means communicating with the inflatable bladder whereby the bladder may be bled and inflating fluid may be inserted into the bladder, independent serrated slips mounted in the wedge, arranged to contact the pipe when the wedge is contracted, and
the wedge constructed of an elastic deformable material which surrounds the slips except where the slips contact the pipe.

7. The invention of claim 6 wherein:
the wedge is segmented radially along the axis thereof.

8. The invention of claim 6 wherein:
each slip includes a groove across the inside thereof, which groove includes and communicates with the wedge.

9. The invention of claim 6 wherein:
the bladder includes a cavity member and a head member telescopically arranged about a portion of the cavity member.

* * * * *

UNITED STATES PATENT OFFICE
CERTIFICATE OF CORRECTION

Patent No. 3,843,167  Dated October 22, 1974

Inventor(s) Bo Gronstedt

It is certified that error appears in the above-identified patent and that said Letters Patent are hereby corrected as shown below:

In the title page, item [76] change the inventor's address from "1540 Hubbard Rd., Pasadena, Texas, 44057" to --207 Mockingbird, Pasadena, Texas  77502--

Signed and Sealed this

*first* Day of *June 1976*

[SEAL]

Attest:

RUTH C. MASON
*Attesting Officer*

C. MARSHALL DANN
*Commissioner of Patents and Trademarks*